United States Patent [19]
Foster

[11] Patent Number: 5,693,295
[45] Date of Patent: Dec. 2, 1997

[54] CATALYTIC CONVERTER

[75] Inventor: Michael Ralph Foster, Columbiaville, Mich.

[73] Assignee: General Motors Corporation, Detroit, Mich.

[21] Appl. No.: 586,128

[22] Filed: Jan. 16, 1996

[51] Int. Cl.[6] .................................................. B01D 53/34
[52] U.S. Cl. ..................... 422/180; 422/171; 422/177; 422/211; 422/222; 60/299; 502/439; 502/527; 55/523
[58] Field of Search ........................... 422/169–171, 422/177, 179, 180, 189–190, 211, 221, 222; 60/299; 55/DIG. 30, 523; 502/439, 527; 428/593, 594, 116

[56] References Cited

U.S. PATENT DOCUMENTS

| 3,852,041 | 12/1974 | Moore et al. | 60/299 |
|---|---|---|---|
| 4,239,733 | 12/1980 | Foster et al. | 422/179 |
| 5,187,142 | 2/1993 | Richmond et al. | 502/439 |
| 5,330,728 | 7/1994 | Foster | 422/177 |

*Primary Examiner*—Hien Tran
*Attorney, Agent, or Firm*—Anthony Luke Simon

[57] ABSTRACT

A vehicular catalytic converter (10) is disclosed having a plurality of catalytic monoliths (24,26). The first (24) and second (26) catalytic monoliths are connected to each other at an angle. Any number of catalytic monoliths may be serially connected at angles to increase the gas-to-catalyst contact within the catalytic converter (10) thus creating a more efficient catalytic converter.

3 Claims, 4 Drawing Sheets

CATALYTIC CONVERTER

The invention relates to vehicular catalytic converters.

DESCRIPTION OF THE RELATED ART

Catalytic converters include catalysts that, under appropriate conditions, stimulate chemical reaction of gaseous molecules. When placed in vehicle engine exhaust systems, catalytic converters stimulate reactions of exhaust gases to eliminate undesirable species thereof and help vehicles meet government-mandated exhaust-gas emissions regulations.

SUMMARY OF THE INVENTION AND ADVANTAGES

Advantageously this invention provides a catalytic converter designed to improve exhaust chemical conversion efficiency.

Advantageously, according to one example, this invention provides a catalytic converter including at least a first monolith with a first flow channel axis and second monolith with a second flow channel axis, wherein the first and second monoliths are connected together at first and second mating faces so that exhaust gas flows through the first monolith, past the first and second mating faces into the second monolith, wherein the first and second mating faces are at unequal angles relative to their respective flow channel axes, wherein the gas changes direction when entering the second monolith and wherein the first and second monoliths have unequal cross-sectional areas.

An advantage associated with the subject invention is an increased surface area over which the emissions must flow. More specifically, the two monoliths are attached together at an angle and the angle of the exit surface of the first monolith with respect to the axis of the first monolith is not equal to the angle of the entrance surface of the second monolith with respect to the axis of the second monolith. This feature coupled with the fact that the system must be a closed system requires a change in surface area between the monoliths and, in this example, the monoliths are arranged so that the second monolith has the increased surface area. The increase in surface area reduces the flow restrictions on the emission stream.

This example, like the other examples described herein, forces a change of direction in the gas flow between the first and second monolith, imparting turbulence and thereby decreasing the boundary layer between the gas and the catalyst. This results in increased contact between the gas and the catalyst, increasing the efficiency and decreasing the warm-up time of the converter. Additionally, because the first monolith is coaxial with the inlet and because exhaust flow through the inlet has a fairly even distribution, the gas flow through the first monolith has a fairly even distribution. The second monolith, which is the main catalyst has a much larger cross section than the first monolith and a much larger frontal area, receives its flow directly from the first monolith. Each flow channel in the first monolith feeds more than one flow channel in the second monolith. The number of flow channels in the second monolith fed by each flow channel in the first monolith is the same. Thus the second monolith receives the same flow distribution as the first monolith, which is the fairly even flow distribution of the turbulent flow entering the first monolith.

Additionally, after the first change in direction, when the exhaust gas is flowing through the second monolith, it is flowing with a fairly even distribution through more flow channels than in the first monolith. This increase in flow channels reduces the restriction imparted on the exhaust flow by the second monolith while at the same time exposing the exhaust gas to more catalyst. Thus advantages are obtained by continuing the same flow distribution in the first monolith to the second monolith with its many more flow channels and larger cross-sectional area.

Advantageously this invention allows further improved efficiency in obtaining the light-off temperature. The converter according to this invention may have as the first catalytic monolith a monolith with a small frontal area (or flow cross section). The small frontal area or flow cross section first monolith will, by virtue of the fact that it forces all of the exhaust gas past its small frontal area, heat to light-off temperature quicker than a large frontal area catalyst. The second catalytic monolith has a larger flow cross section providing a pressure drop minimizing the restriction of flow through the catalyst. Thus advantageously according to this invention, the catalytic converter makes use of a small frontal area to obtain fast light off of the first catalytic monolith while avoiding excessive flow restrictions on the emission exhaust gases.

Advantageously, according to another example, this invention provides a catalytic converter including at least a first monolith with a first flow channel axis and a second monolith with a second flow channel axis, wherein the first and second monoliths are connected together at first and second mating faces so that exhaust gas flows through the first monolith, past the first and second mating faces into the second monolith, wherein the first and second mating faces are at equal angles relative to their respective flow channel axis, wherein the exhaust gas changes direction when entering the second monolith and wherein the first and second monoliths have equal cross-sectional areas. While in this example the second monolith does not have an increased cross-sectional area relative to the first monolith, the change in direction forced on the gas flow imparts turbulence decreasing the boundary layer between the gas and the monolith flow passage walls and increasing the efficiency of the catalytic converter.

Advantageously, according to another example, this invention provides a catalytic converter having a plurality of at least first and second catalytic monoliths connected to each other at a first angle, wherein an exhaust gas flows through the first catalytic monolith and then into the second catalytic monolith, wherein the exhaust gas changes direction when flowing from the first to second catalytic monoliths, wherein the change in direction is of greater than zero degrees and less than ninety degrees. Third and fourth catalytic monoliths may be added wherein the exhaust gas enters the third monolith when exiting the second monolith and enters the fourth monolith when exiting the third monolith. The second and third monoliths are connected together at a second angle and the third and fourth monoliths are connected together at the first angle, wherein gas flow through the third monolith is parallel to the gas flow through the first monolith and the gas flow through the fourth monolith is parallel to the gas flow through the second monolith.

The resulting structure is a zigzag configuration for the gas to flow. Because the gas is forced to change directions as it enters each successive monolith, a degree of turbulence is imparted on the gas flow. As described above, this turbulence reduces the boundary layer between the gas and the monolith that occurs in laminar flow and allows more of the gas molecules to reach the catalyst. This allows both faster warm-up and increased efficiency of the converter.

In yet another example according to this invention, a plurality of at least three monoliths are connected together to form a flow path of exhaust gas so that the exhaust gas changes direction as it enters each of the monoliths. The flow axis of the monoliths are oriented such that the flow axis of at least one of the plurality of monoliths is not in or parallel to a plane common to the other two of the plurality of monoliths. This allows the advantages imparted by the change of direction within the monoliths and further provides a catalytic converter with several bends, allowing more flexible placement of the converter.

BRIEF DESCRIPTION OF THE DRAWINGS

The present invention will now be described by way of example with reference to the following drawings, in which:

FIG. 1b is an enlarged view of only the substrates of figure 1a;

DETAILED DESCRIPTION OF THE DRAWINGS

Figure 1A:
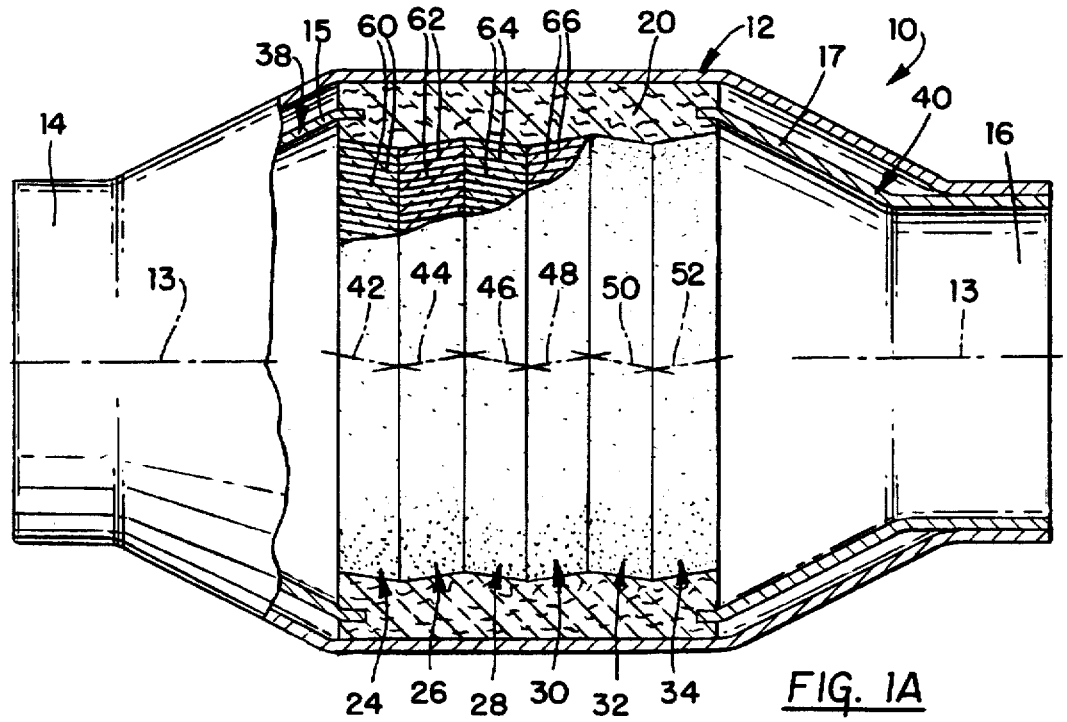
FIG. 1a is a cross-sectional view of an example catalytic converter according to this invention.

An example vehicular catalytic converter assembly is generally shown as reference 10 in FIG. 1a. The converter comprises first, second, third, fourth, fifth and sixth catalyst coated substrates (also referred to as monoliths) 24, 26, 28, 30, 32 and 34 mounted within rigid canister or outer housing 12 having an inlet 14 and an outlet 16. The canister 12 may be constructed of stamped stainless steel or other material suitable for operation in a high temperature exhaust environment. The canister 12 may comprise individual top and bottom pieces butt, lap or flange welded together. Alternative fabrication methods for canister 12, such as spin forming to form the inlet 14 and outlet 16, may also be employed.

Substrates 24–34 are supported within the housing portion 11 of canister 12 by the shape of the canister wall and by insulative material 20 disposed between the wall of canister 12 and the substrates 24–34. The insulative material 20 is operable to limit movement of the substrates 24–34 and to evenly distribute pressure along the outer surface thereof. Preferred insulative materials may consist of expandable ceramic/organic or intumescent mats or stainless steel mesh, depending on the material selected for construction of the substrate.

Inner end cones 38 and 40 at the inlet and outlet 14 and 16 to the converter 10 each have flared ends 15 and 17 guiding exhaust gas into and out of the substrates 24 and 34, respectively and providing an insulating air gap to reduce the temperature of outer housing 12.

Figure 1B:
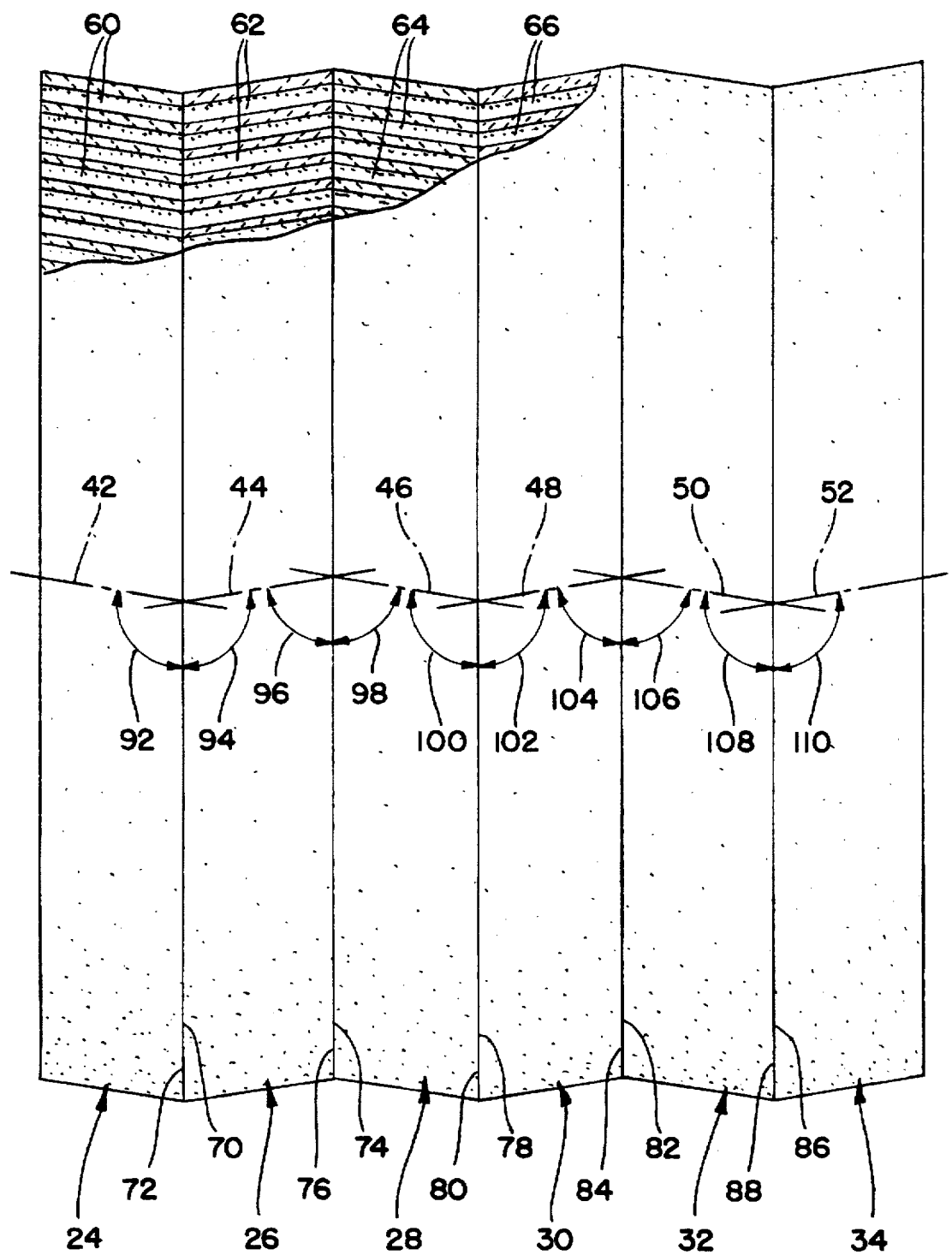

As seen more clearly in FIG. 1b, the substrates 24–34 are mounted within the housing portion 11 of the canister 12 in a unique configuration to increase the efficiency of the catalytic converter 10. The inlet and outlet 14 and 16 are axially aligned with axis 13. The first substrate 24 has flow passages 60 aligned parallel to axis 42. Exhaust gas traveling parallel to axis 13 through inlet 14 enters substrate 24 and changes direction (approximately 10 degrees in this example) so that it flows parallel to axis 42 through the air flow channels 60 in substrate 24.

The exit face 70 of substrate 24 is mounted to the frontal face 72 of substrate 26. The angle 92 between the exit face 70 and axis 42 of substrate 24 (i.e., 100 degrees in this example) is the same as the angle 94 between the frontal face 72 and axis 44 of substrate 26. The result is that substrates 24 and 26 have the same cross sectional shape and area and can be cut from the same stock.

The way the substrates 24 and 26 are mounted causes the gas flowing though substrate 24 to change direction when it enters substrate 26. In this example the change in direction is approximately 20 degrees so that the gas flowing through flow channels 62 in substrate 26 flows parallel to axis 44. The change in direction between substrates 24 and 26 imparts a degree of turbulence on the exhaust gas flowing through the substrates. The turbulence reduces the boundary layer between the gas flow and the walls of the flow passages so that more gas molecules come into physical contact with the catalyst coated to the substrate 26, increasing the efficiency of the catalyst or substrate 26.

The exit surface 74 of substrate 26 is mounted against the frontal surface 76 of substrate 28. The exit surface 74 is at an angle 96 (i.e., in this example 80 degrees) to axis 44 of substrate 26 and frontal surface 76 is at an equal angle 98 to axis 46 of substrate 28. Because angles 96 and 98 are equal, the substrates 26 and 28 have the same size and shape cross section and can be cut from the same stock. The flow passages 64 through substrate 28 are parallel to axis 46 and the exhaust gas flowing from substrate 26 to substrate 28 experiences a change of direction (i.e., in this example of 20 degrees) upon entering substrate 28. Similar to when the gas enters substrate 26, the change of direction when the gas enters substrate 28 imparts turbulence on the gas causing the boundary layer between the gas and the substrate wall to thin and increasing the amount of gas molecules contacting the walls of the catalyst-coated substrate 28.

Exit surface 78 of substrate 28 is mounted against frontal surface 80 of substrate 30. Similar to the substrates 24 and 26, the angle 100 between exit surface 78 and axis 46 of substrate 28 is equal to the angle 102 between the frontal surface 80 and axis 48 of substrate 30. Gas flows through passages 66 in substrate 30 parallel to axis 48 so that the same change in direction between substrates 24 and 26 occurs between substrates 28 and 30.

The exit surface 82 of substrate 30 and frontal surface 84 of substrate 32 are at equal angles 104 and 106 with respect to the axes 48 and 50 respectively. The exit surface 86 and frontal surface 88 of substrates 32 and 34 are at equal angles 108 and 110 relative to the axes 50 and 52, respectively. Thus substrates 30 and 32 interface in the same manner that substrates 26 and 28 interface and substrates 32 and 34 interface in the same manner that substrates 28 and 30 interface. The resulting structure is that the substrates 24–34 each form a segment of a zigzag pattern support structure for the catalyst. All of the interfaces between the substrates 24–34 achieve total transfer of the gas flowing in one substrate to the subsequent substrate and all of the substrates 24–34 have the same diameter.

The zigzag pattern in the example shown is implemented to fit in a straight housing 12 with the inlet and outlet axes 13 aligned. In the example shown, all of the substrates 24–34 forming a segment of the zigzag pattern are of equal length so that the flow of the exhaust gas through the substrates never varies by more than a predetermined angle from axis 13. In the example discussed above the predetermined angle is 10 degrees. It is recognized that the angle will vary from implementation to implementation and will generally be between zero and 90 degrees.

In operation, the converter 10 is mounted within an associated exhaust system for an internal combustion engine (not shown) such that exhaust gas departing the engine is conducted into the converter through the inlet 14. Subsequent to entering the converter canister, exhaust flow enters substrate 24, being distributed across the entire front face of substrate 24. Exhaust entering substrate 24 flows parallel to axis 42. Where the exit and frontal surfaces of subsequent substrates 26–34 meet, the exhaust gas changes direction so that it flows parallel to axis 44 in substrate 26, parallel to axis 46 in substrate 28, parallel to axis 48 in substrate 30, parallel to axis 50 in substrate 32 and parallel to axis 52 in substrate 34. As exhaust gas flows through the substrates within converter 10, the catalyst coating of the substrates simulates a reduction in the content of regulated exhaust constituents.

At each change in direction of the exhaust gas traveling from one substrate to the next, a degree of turbulence is imparted on the exhaust gas. This turbulence reduces the boundary layer between the exhaust gas and walls of the substrates, exposing more of the exhaust gas to the catalyst coating the walls of the substrates than would occur in a straight monolith with no changes in flow direction, increasing the efficiency of the converter.

In a preferred embodiment of the catalytic converter of the present invention, substrates 24–34 are constructed of an extruded ceramic material. The actual composition of the ceramic may vary depending upon the particular application and coating to be used, however, a material such as corderite is contemplated. In typical applications of extruded ceramic monolith substrates, the material is extruded such that longitudinally extending flow passages are formed therein. The extrusion is cut perpendicular to the longitudinal axis and the flow passages, resulting in a substrate of desired length. The example of the present invention shown in FIGS. 1a and 1b contemplates a similar ceramic extrusion from which the several segments are formed from a series of cuts in the stock extrusion at an angle of 100 degrees to the flow axis of the extrusions. The segments are then re-mounted together with every other segment rotated 180 degrees from its original alignment to form the zigzag pattern shown.

Figure 2:
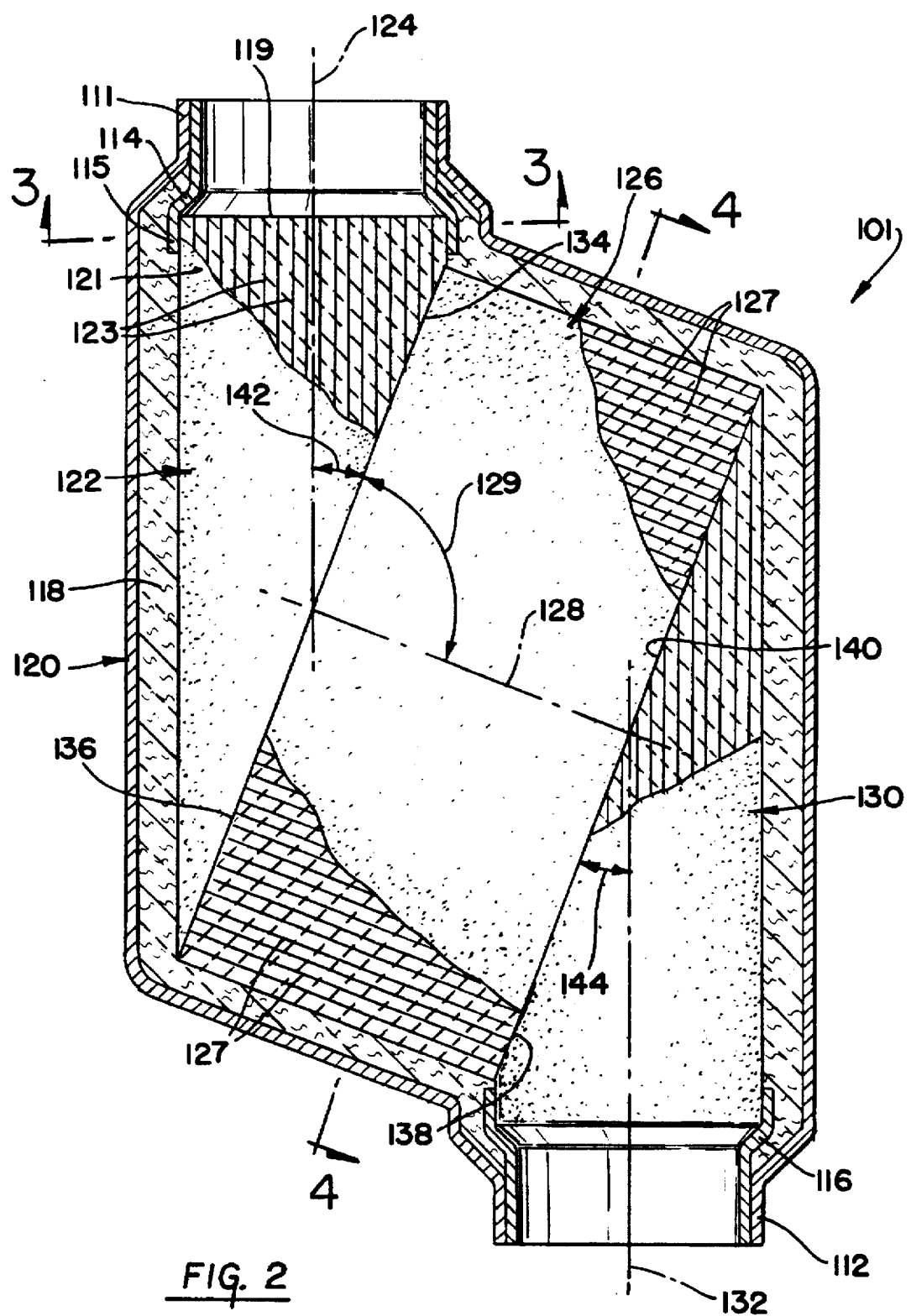
FIG. 2 is a cross-sectional view of a second example catalytic converter according to this invention.

Referring now to FIG. 2, the example catalytic converter 101 shown includes a canister 120 having inlet 111 and outlet 112 as shown. The converter catalyst is carried by the three monolith substrates 122, 126 and 130 in a known manner. The substrates 122, 126 and 130 are maintained in place within canister 120 by the shape of the canister 120 and by the insulating intumescent material 118, similar to insulating material 20 described above with reference to FIGS. 1a and 1b.

Figure 3:
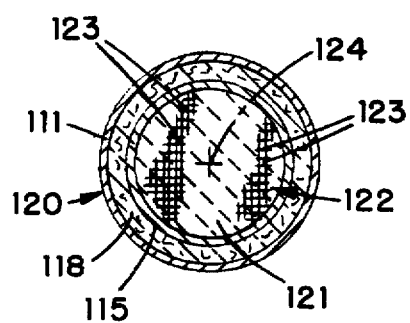
FIG. 3 is a cross-sectional view taken along lines 3—3 of FIG. 2.

Exhaust gas enters the converter 101 via inlet 111 having a circular cross section shown in FIG. 3. Inlet 111 includes inner end cone 114, fit snugly within inlet 111 and having a flared out end 115 surrounding the first end 121 of substrate 122. Substrate 122 has a circular cross section and a series of passages 123 parallel to axis 124 so that gas flowing through the substrate 122 flows parallel to axis 124 in a known manner.

Gas exits substrate 122 from face 134, cut at an angle 142 greater than zero degrees and less than 90 degrees to the axis 124. Face 134 of substrate 122 abuts face 136 of substrate 126 so that all of the gas flowing through substrate 122 is transferred to substrate 126. The flow of exhaust gas through inlet 111 typically has a fairly even distribution and thus is substantially evenly distributed across the entire frontal face 119 of substrate 122 and thus the flow through substrate 122 is fairly well distributed.

Figure 4:
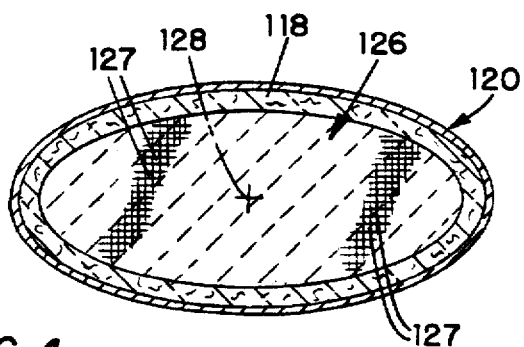
FIG. 4 is a cross-sectional view taken along lines 4—4 of FIG. 2.

Gas flows through substrate 126 is parallel to the axis 128, representing a change in direction of less than ninety degrees from the direction of gas flow in substrate 122. Assuming as in the example shown that surface 136 of substrate 126 is perpendicular to the axis 128 of substrate 126, the amount of change in direction of the gas leaving substrate 122 and entering substrate 126 is equal to ninety degrees minus angle 142. As shown in FIG. 4, substrate 126 has an elliptical shaped cross section with a width along the minor axis equal to the diameter of substrate 122 and a length along the major axis much greater than the diameter of substrate 122. The result is that substrate 126 offers a much larger cross section and area of flow contact between the exhaust gas and the catalyst coating the substrate than offered by substrate 122.

As mentioned above the flow of exhaust gas through substrate 122 is fairly well distributed. Because of the larger cross section of substrate 126, each flow channel 123 of substrate 122 is aligned with more than one flow channel 127 of substrate 126. Also, the number of flow channels 127 in substrate 126 aligned with each of the flow channels 123 in substrate 122 is the same. The result is that substrate 122 imparts its same flow distribution to substrate 126. Thus the exhaust gas flow through substrate 126 is fairly well distributed.

The construction shown in FIG. 2 causes a change in direction in exhaust gas flow as the gas flows from monolith 122 to monolith 126, providing the same benefits described above resulting from imparted turbulence and the reduced boundary layer. Additionally, the larger cross sectional area of substrate 126 and the fact that substrate 122 distributes the exhaust gas evenly through substrate 126 both increases the area of catalyst exposed to the exhaust gas and decreases the flow restriction of the substrate 126 on the exhaust gas flow.

Because the exhaust gas is well distributed by substrate 122 into substrate 126, the peak flow velocity is lower in substrate 126 which makes it more efficient and the converter more efficient at reducing regulated emissions.

In the example shown, front surface 136 of substrate 126 is substantially perpendicular to the axis 128 of substrate 126, but this need not be the case and the front surface 136 may be cut at an angle of less than 90 degrees to the axis 128.

The exhaust gas exits substrate 126 at face 138 and enters substrate 130 at face 140. Face 140 of substrate 130 is cut at an angle 144 to axis 132 of substrate 130 so that the shape and size of face 140 matches that of face 138. Gas flows through substrate 130 in a direction parallel to axis 132 and exits substrate 130 into inner end cone 116 and out of the converter 101 through outlet 112.

If, as shown, the exit face 138 of substrate 126 matches front face 136 and if axis 132 of substrate 130 is parallel to axis 124 of substrate 122, then substrates 122 and 130 may be cut from the same piece of circular cylindrical substrate stock and the single cut to form face 134 simultaneously forms face 140.

In operation, the first substrate 122 having a smaller cross sectional area is a smaller thermal mass per length than substrate 126. During cold start of the engine, substrate 122 quickly absorbs heat from the entering exhaust gas to quickly reach light-off temperature. As the exhaust gas flows from substrate 122 to substrate 126 and from substrate 126 to substrate 130, it changes direction twice, increasing gas turbulence and contact between the gas and the catalyst coating substrates 126 and 130. The substrate 126 has a much larger suffice area than substrate 122, offering increased catalyst surface for contact with the exhaust gas while simultaneously providing a low restriction flow path. This structure provides for increased converter reduction efficiency while decreasing the amount of obstruction imposed by the converter 101 on the exhaust gas flow.

Substrate 130 provides additional catalyst exposure to the exhaust gas and redirects the gas to the direction of axis 132 and outlet 112. If desired, substrate 130 may be omitted and the exhaust gas exiting substrate 126 may be redirected toward outlet 112 by either an angled plenum wall or a less restrictive honeycomb structure of the type known for directing air flow, for example of the type often used in internal combustion engine air intake systems.

In one example, substrates 130 and 122 may comprise a metal honeycomb structure having on the order of twenty cells or less per square inch. The metal honeycomb structure is coated with a catalyst in a known manner for achieving the desired reduction of the exhaust gasses.

The attachment of the substrates to increase the flow area is obtained by having the mating surfaces of the substrates at unequal angle to their respective axes. For example, angle 142 between exit face 134 and axis 124 of substrate 122 is less than 90 degrees while the angle 129 between frontal face 136 and axis 128 of substrate 126 is approximately 90 degrees.

The example of the present invention shown in FIG. 2 contemplates monolith substrates formed from ceramic extrusions of at least two cross sectional sizes, for example the sizes shown in FIGS. 3 and 4. At least the circular substrate is cut at an acute angle to its axis so that faces of substrates to be abutted have the same shape and area. Thus the angle at which each piece is cut is determined by the overall area of the face of the substrate to which that piece is to be matched. In the example in FIGS. 2–4 where the first substrate 122 has a circular cross section and the second substrate 126 is elliptical with a minor axis equal to the diameter of the circular cross section of substrate 122, the cross sectional areas of abutting substrates will match if the height and shape of each abutting face matches the other.

In the above examples, the cross section of the various substrates shown are circular and elliptical. The shape of the cross section of each substrate is arbitrary and may be varied by a system designer. For example the first cross section may be square and the second cross section rectangular. The only restriction is that the second (or third, fourth, etc.) substrate have a frontal face matching the face of the gas-exiting end of the previous substrate.

In some of the examples, described above there is a change in cross-sectional area between substrates and in others there is not. In general, as long as the mating substrate faces have the same angle relative to their respective flow channel axes, no change in cross sectional area occurs. When the mating substrate faces have different angles relative to their respective flow channels, a change in cross sectional area and in cross sectional shape occurs.

The above examples primarily refer to ceramic substrates. The type of substrate to be used is arbitrary and may be varied by the system designer. For example, metal substrates of known construction may be used for any or all of the substrates shown.

In examples such as shown in FIG. 2, where there is an abrupt change in direction of the exhaust gas flowing through the substrates, flow losses due the abrupt change in direction may be minimized by bending the flow channels slightly at the ends of the substrates that face each other to make the turn less abrupt. Alternatively, an intermediate substrate (i.e., wedge-shaped) with curved flow channels may be implemented between the adjoining substrates.

In implementation of this invention to replace a conventional catalytic converter in a vehicle with limited space available in the floor pan, the second substrate's flow axis may be made parallel to the transverse axis of the space available in the floor pan to achieve the most efficiency.

Figures 5, 6:
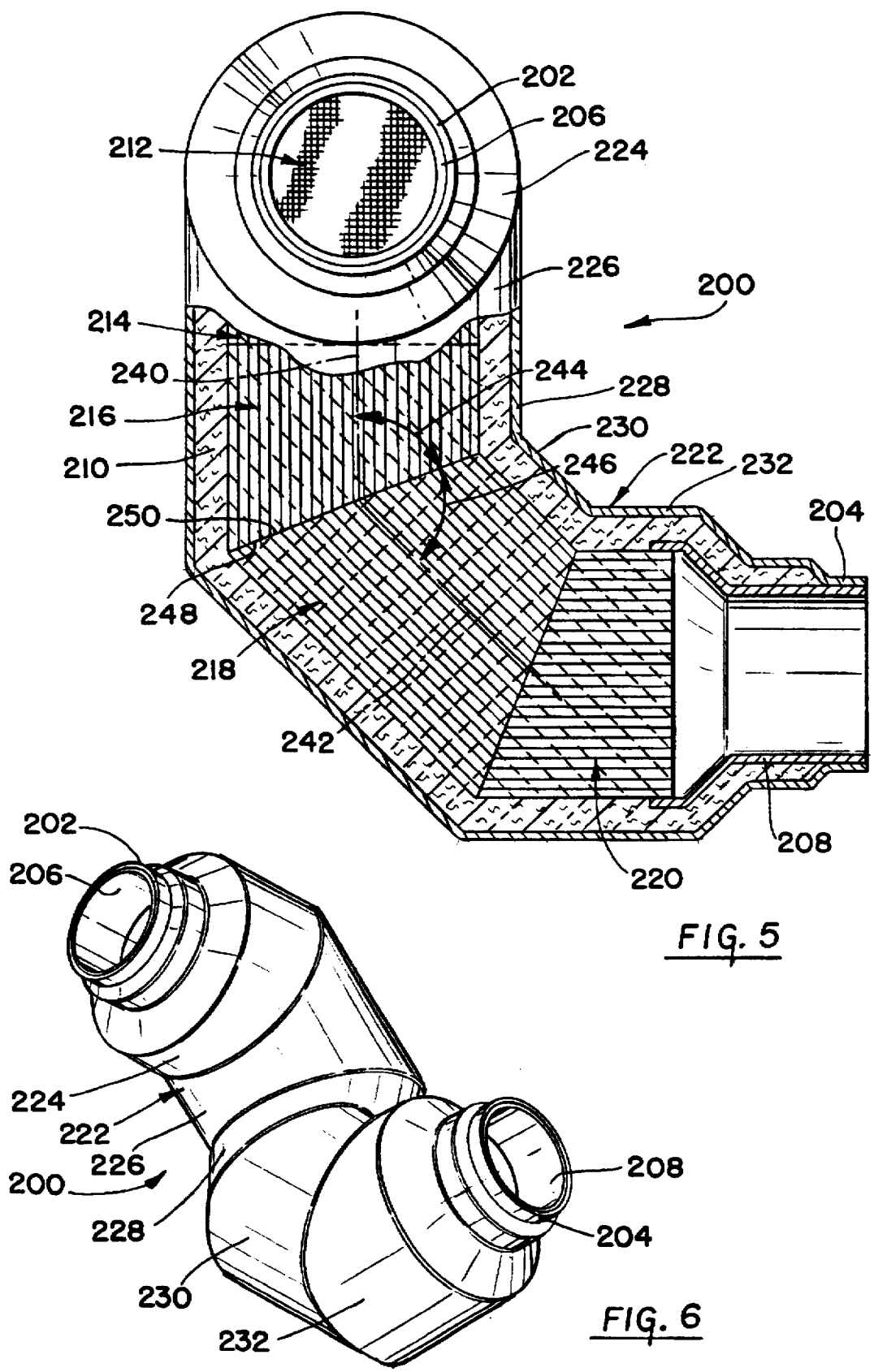
FIGS. 5 and 6 are views of a third example catalytic converter according to this invention.

Referring now to FIGS. 5 and 6, the example catalytic converter 200 shown includes a plurality of monoliths 212, 214, 216, 218, and 220 held in place by monolith retention material 210 within canister 222. The metal canister 222 is tubular in shape and has a plurality of linear segments 224, 226, 228, 230, and 232 each joined to neighboring segments 224, 226, 228, 230, and 232 at an angle thereto. The canister 222 can be made in separate tubular sections welded together or may consist of two half-tube sections, each consisting of one axial half of the inlet and outlet 202 and 204 and the sections 224 –232 butt, lap or flange welded together.

The inlet 202 has an inner end cone 206 similar to inner end cone 15 in FIG. 1a. Outlet 204 has an inner end cone 208 similar to inner end cone 17 in FIG. 1a. Between the inlet and the outlet, a plurality of catalyst-coated monoliths 212–220 are provided, each having axial flow paths guiding the exhaust gas through the converter 200.

Monolith 212 is located within segment 224, monolith 214 is located within segment 226, monolith 216 is located within segment 228, monolith 218 is located within segment 230 and monolith 220 is located within segment 232. In segment 224, gas flow is parallel to the axis of segment 224, in segment 226, gas flow is parallel to the axis of segment 226, in segment 228, gas flow is parallel to the axis of segment 228 and in segment 230, gas flow is parallel to the axis of segment 230. The monoliths 212–220 are connected together to provide a continuous flow path from the inlet 202 to the outlet 204. In this example, all of the monoliths 212–220 are of equal diameter and are connected together to guide the exhaust through the necessary changes in directions as the exhaust gas flows through the various sections 224–232 of the converter 200 to maintain the even exhaust gas flow distribution through the monoliths 212–220.

Each monolith 212–220 abuts an adjacent monolith 212–220 wherein each pair of abutting faces are at equal angles with respect to the respective monolith axis. For example, for monoliths 216 and 218, the faces 248 and 250 are at equal angles 244 and 246 relative to the respective axes 240 and 242. This allows the faces of the abutting monoliths 212–220 to have the same cross-sectional area and allows a one-to-one correspondence of flow passages from one monolith to the next so that the flow distribution in the monolith 212 closest to the inlet 202 is maintained throughout the entire series of monoliths 212–220 throughout the converter 200.

As in the above examples, with each change in direction of the exhaust through the monoliths 212–220, turbulence is imparted on the exhaust flow reducing the boundary layer of the exhaust gas at the walls of each interior flow path of the monolith thereby increasing the amount of gas that comes into contact with the catalyst coating each monolith and increasing the efficiency of the desired reductions within the converter 200.

As can be seen in the example shown, the changes in direction are not limited to the changes in a single plane. For example, in sections 226, 228 and 230, given a plane defined by the axes of any two of the adjacent sections 226–230, the axis of the other section, either 226 or 230, is not in the same plane. Thus, as can be seen, the converter 200 can be constructed to allow more flexible use of space in the vehicle and can be designed to go around obstructing pans or other components of the vehicle engine or undercarriage and does not require the conventional space in the vehicle floor pan.

I claim:

1. A catalytic converter comprising:

a housing with an inlet having an inlet axis, wherein exhaust gas flows into the housing through the inlet;

within the housing, a first catalyst-coated substrate through which the exhaust gas flows in a first direction parallel to the inlet axis;

within the housing, a second catalyst-coated substrate disposed to receive the exhaust gas that flows through the first catalyst-coated substrate, wherein the exhaust gas flows through the second catalyst-coated substrate in a second direction greater than zero degrees different from the first direction, wherein the first catalyst-coated substrate has a first face perpendicular to the inlet axis and a second face at an angle to the inlet axis wherein the angle is greater than zero degrees and less than ninety degrees.

2. A catalytic converter according to claim 1 wherein the second catalyst-coated substrate has a third face abutting the second face of the first catalyst-coated substrate, wherein the second and third faces are of equal size and shape.

3. A catalytic converter comprising at least first, second and third catalyst-coated substrates connected together so that exhaust gas flowing through the first catalyst-coated substrate flows parallel to a first flow channel axis and changes direction when entering the second catalyst-coated substrate, wherein the exhaust gas flows through the second catalyst-coated substrate parallel to a second flow channel axis and changes direction again when entering the third catalyst-coated substrate, wherein the exhaust gas flows through the third catalyst-coated substrate parallel to a third flow channel axis, wherein the first and second catalyst-coated substrates mate together at first and second mating faces, wherein the first mating face is at a first angle with respect to the first flow channel axis and the second mating face is at a second angle with respect to the second flow channel axis, wherein the first and second angles are equal, wherein the second and third catalyst-coated substrates mate together at third and fourth mating faces, wherein the third mating face is at a third angle with respect to the second flow channel axis and the fourth mating face is at a fourth angle with respect to the third flow channel axis, wherein the third catalyst-coated substrate has a third substrate axis intersecting at an angle greater than zero degrees a plane defined by a first substrate axis of the first catalyst-coated substrate and a second substrate axis of the second catalyst-coated substrate.

* * * * *